INVENTORS
Rene D. Colinet
James E. Norcross
BY
ATTORNEYS

INVENTORS
Rene D. Colinet
James E. Norcross
BY
[signature]
ATTORNEYS

INVENTORS
Rene D. Colinet
James E. Norcross
BY
ATTORNEYS

INVENTORS
Rene D. Colinet
James E. Norcross
BY
ATTORNEYS

INVENTORS
Rene D. Colinet
James E. Norcross
BY
[signature]
ATTORNEYS

INVENTORS
Rene D. Colinet
James B. Norcross
BY
ATTORNEYS

INVENTORS
Rene D. Colinet
James E. Norcross
BY
ATTORNEYS 3,437,786
MAGNETIC CRAWLER
Rene D. Colinet, Philadelphia, and James E. Norcross, Media, Pa., said James E. Norcross assignor to Arcos Corporation, Philadelphia, Pa., a corporation of Pennsylvania, and said Rene D. Colinet assignor to Industrial Research Laboratory, Inc., Philadelphia, Pa., a corporation of Pennsylvania
Filed Feb. 21, 1966, Ser. No. 529,092
Int. Cl. B23k 9/12
U.S. Cl. 219—126 4 Claims

ABSTRACT OF THE DISCLOSURE

A carriage capable of travelling upward along a vertical weld groove, carrying with it shoe means for retaining molten metal in the groove, guided by a guiding roll in the weld groove, raised by hoisting means and held against magnetic work by free idling magnetic rolls.

*Description of invention*

The present invention relates to carriages for moving on vertical surfaces, either vertically or horizontally, or in any other direction, and on inclined or curved surfaces including overhung surfaces, such as are found in spherical or cylindrical tanks and bows and sterns of ships.

Vehicles are known which rely on pads or shoes magnetically adhering to steel surfaces, but they hold against the force of gravity under a serious disadvantage, since their total weight is limited to only about $\frac{1}{10}$ to $\frac{1}{7}$ of the total magnetic attraction to the vertical surface, because such is the average coefficient of friction for steel sliding on steel.

The only case where such prior art pads or shoes are fully efficient is when the carriage is holding upside down under a horizontal steel plate. The gravitational forces are then directly opposed to the magnetic forces and no sliding action takes place. This situation is, however, of little practical interest.

The same cause for inefficiency exists for other known carriages which guide on separate stationary tracks which are held magnetically on vertical steel surfaces. Again, these tracks tend to slide down even though their magnetic pads exert attractive forces nearly ten times greater than the total weight of the carriage plus its track.

According to the present invention, which also uses permanent magnets or electromagnets as a primary holding means, all sliding motion at 90° or thereabout from the direction of the magnetic attraction is eliminated.

Several embodiments of the present invention are shown, all having the common feature of avoiding reliance upon sliding action of magnetically attracted components. For example, to travel vertically on a vertical steel plate, the carriage will adhere strongly to the plate by magnetic or electromagnetic free-rotating rolls having no hold at all to prevent the carriage from rolling down. In addition to the magnets, however, the carriage is provided with vertical support from a chain or cable or equivalent suspension means in a fashion employed in hoisting. In a variation, a steel rack is used without any base or support except that it is hooked on the top of the structure, and hangs down, with a motorized pinion on the carriage engaging the rack with a suitable enclosure to prevent the teeth from disengaging.

If the surface is slightly off vertical and overhanging, the carriage will still adhere magnetically to the plate with the full force of its magnetic rolls multiplied by the cosine of the angle of inclination of the plate, while it is supported and moved upward by the pull of a non-vertical chain or cable hooked at the top of the plate. Should the incline become so pronounced as to overload the magnets (up to 25° in ship hulls) then supporting means described later will assist or even reinforce the magnetic effect as much as needed to produce safe operation.

In another embodiment, the carriage travels horizontally on a vertical surface. Here again, the magnets are used for adherence only, with no allowance on frictional grip. The carriage will resist sliding down under gravity pull through other, nonmagnetic means, such as hangers rolling on the top edge of the plate, or the use of a small ledge or edge on the surface, or tack-welding a steel bar of small cross-section on the plate to create such a ledge artificially.

For example, in welding horizontal joints in steel storage tanks of refineries (commonly called three o'clock joints) horizontal sharp-edged wheels can rest by their lips inside the chamfer of the still unwelded joint, on the top edge of the square cut lower plate. Powerful magnetic rolls adhering and rolling upon the plate prevent any risk of the wheel lips losing their grip in the small groove which acts as a support for the entire carriage.

This embodiment demonstrates fully the novel effect obtained by the combination of magnetic attraction and mechanical support. Without the wheels, the weight of the carriage would be limited to about $\frac{1}{10}$ of the magnetic forces, and without the magnets, the wheels could not keep a safe hold on the small ridge of the plate. Only the combined effect of these two distinct means provides safe and easy operation of the carriage when rolling horizontally on a vertical plate.

Such versatile carriages are more and more in demand for automatic welding of hulls or ships, petroleum storage tanks, elevated spherical or ovoid tanks and other large, immovable structures having vertical or overhung surfaces. Another typical application of the invention is in the lining of mine shafts, missile pits or tunnel tubes. The invention is also applicable for accessory operation relating to welding, such as chamfer cutting with torches mounted on the carriage, inspecting finished welds with X-ray or ultrasonic testing equipment mounted on the carriage, or polishing or machining welds or portions of welds with grinders or milling machines mounted on the carriage.

The carriages according to the present invention will suitably be trackless in the sense that they require only a smooth supporting surface, like the road for an automobile, but they require no guiding means such as rails employed by a streetcar. With movement of the carriage over great heights, as on ship hulls which extend for 50 feet or more vertically, the cost of external tracks and the cost of installing them and removing them are prohibitive. The carriage of the invention can operate with the slightest groove or ridge for auto-guidance and eliminates the need for extensive tracks and the like.

The tracking means in one form of the invention will consist in sharp-edged rolls installed on the carriage and engaging in the welding groove before it is filled with weld metal. Details of various embodiments of these devices will be described below.

The drawings illustrate various embodiments of the invention in typical forms, those shown being chosen from the standpoints of convenience in illustration, satisfactory operation and clear demonstration of the principles involved. It will be evident, however, that many other embodiments are possible.

FIGURE 1 is an exploded perspective view of a vertically moving carriage according to the invention, in which numerous parts of the frame have been eliminated for convenience in showing the operating parts.

FIGURE 1*a* is an enlarged elevation of the inside of the front or rear shoe.

Figure 3:
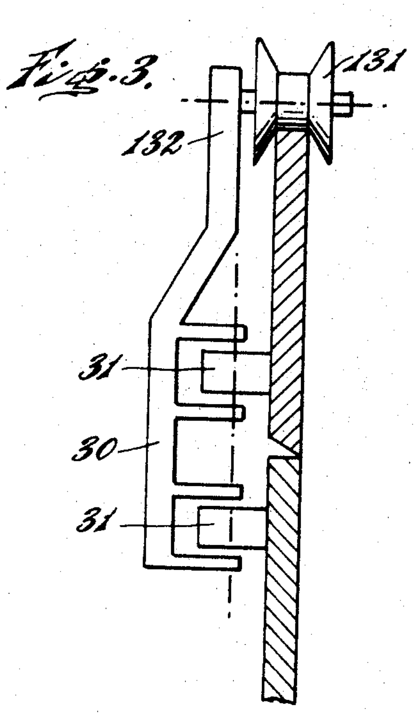
FIGURE 3 illustrates schematically in vertical section another horizontal magnetic crawler which derives its vertical support from flanged wheels rolling on the top edge of the plates being welded.
Figure 3A:
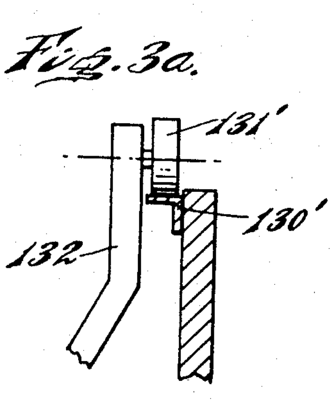

FIGURE 3*a* is a fragmentary view similar to FIGURE 3 showing a modification.

Figure 4:
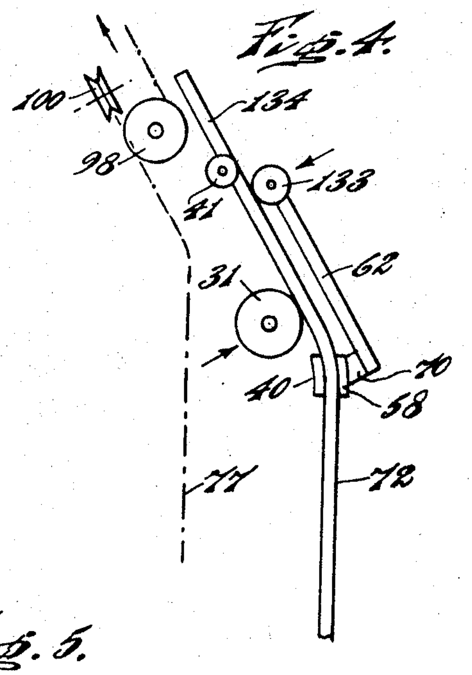

FIGURE 4 is a diagrammatic vertical section showing one way of increasing the pressure of the magnet rolls in the case of overhanging plates.

Figure 5:
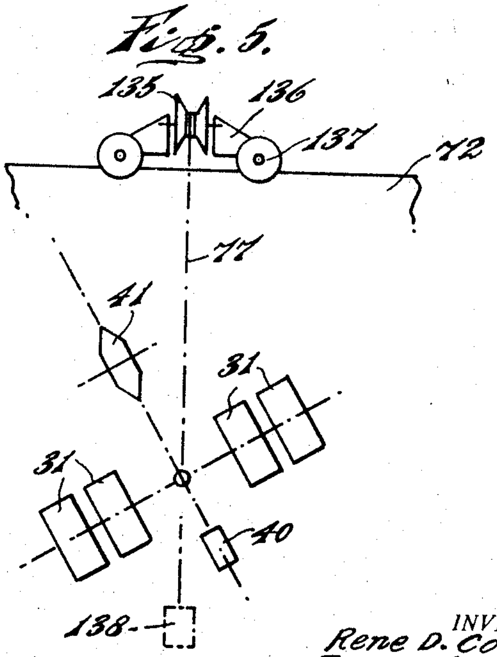

FIGURE 5 illustrates in front elevation one mechanism for balancing the weight of the machine so that the magnet rolls can be used for adherence only.

Figure 6:
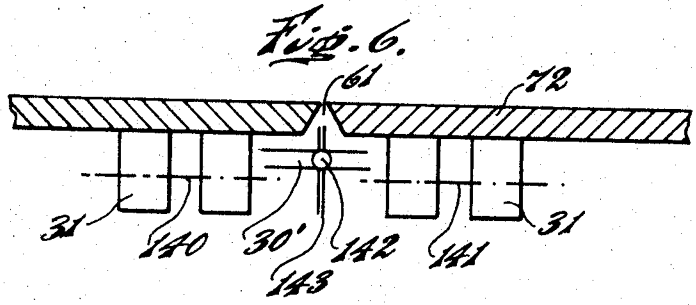

FIGURE 6 is a diagrammatic illustration in horizontal section, the frame being split and pivoted at the middle, so that the half frames follow two plates set at various angles to each other in a welded structure.

Figures 7, 8:
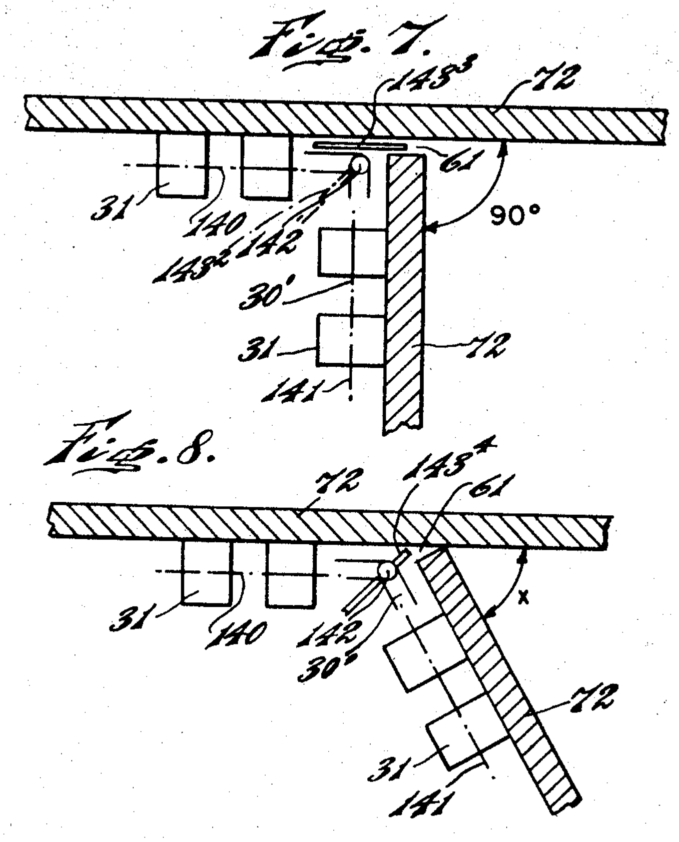

FIGURE 7 is a diagrammatic horizontal section showing the machine of FIGURE 6 set to engage an inner 90° corner or T-joint for fillet or for full penetration welding.

FIGURE 8 is a diagrammatic horizontal section showing the machine of FIGURE 6 set for vertical plates which are disposed at an angle of 180° minus *x*.

Figure 1:
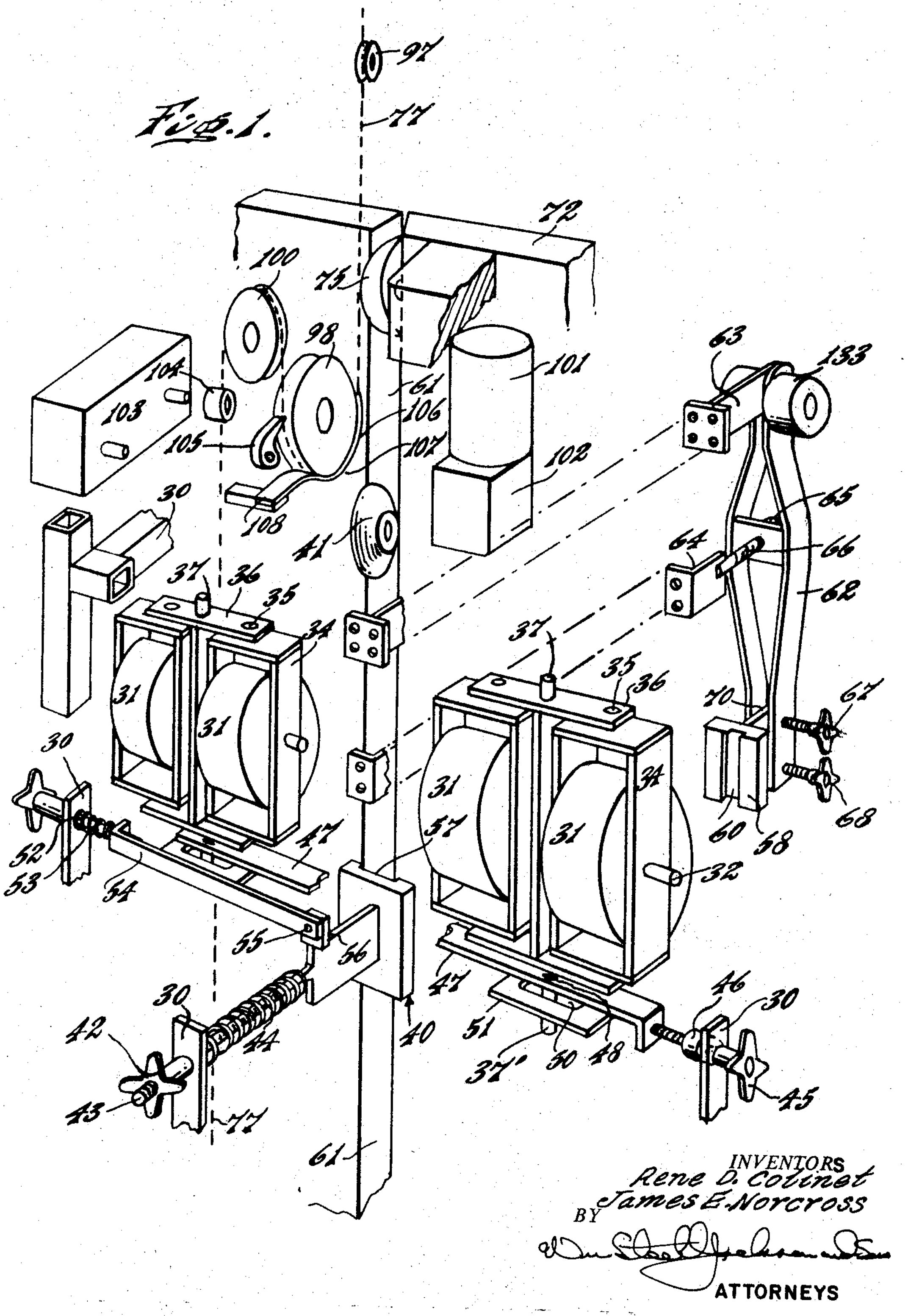
Figure 9:
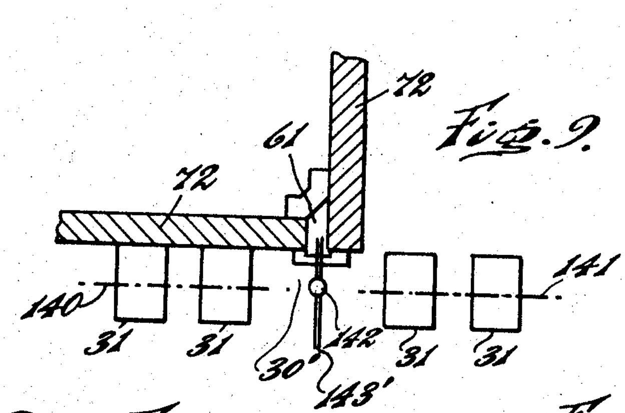

FIGURE 9 shows in diagrammatic horizontal section the use of a machine of FIGURE 1 or FIGURE 6 to weld an external corner of two vertical plates.

Figure 10:
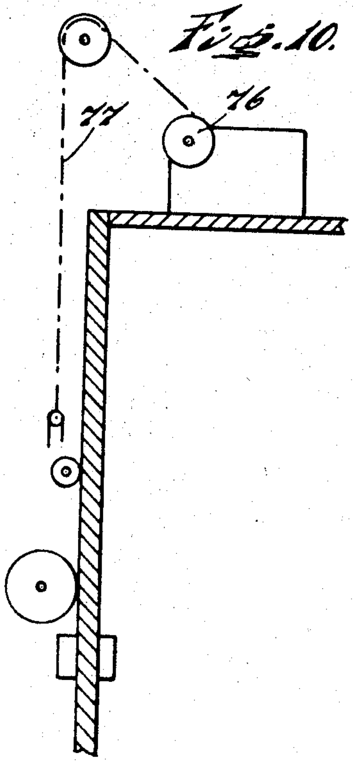

FIGURE 10 illustrates in diagrammatic vertical section a magnetic carriage, a hoisting chain or cable and a stationary winch located at the top of the structure to be welded. The winch is operated by remote control from the carriage to move the carriage vertically.

Figure 11:
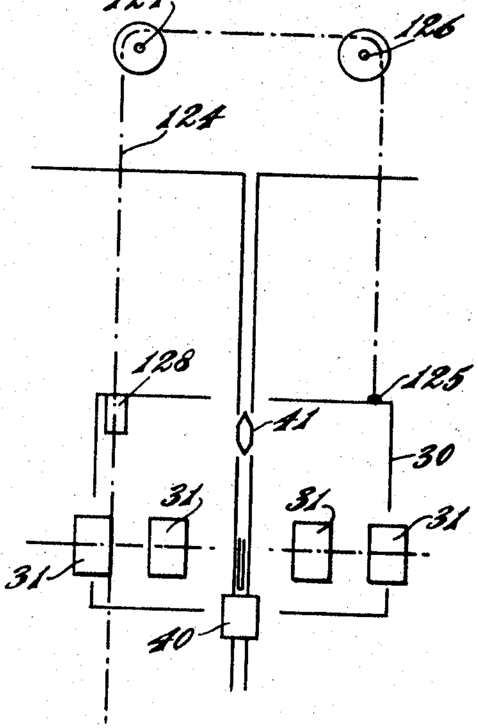

FIGURE 11 is a vertical elevation showing an auxiliary undriven chain used as a safety chain, especially on a device carrying the operator on a platform mounted on the carriage.

Figure 12:
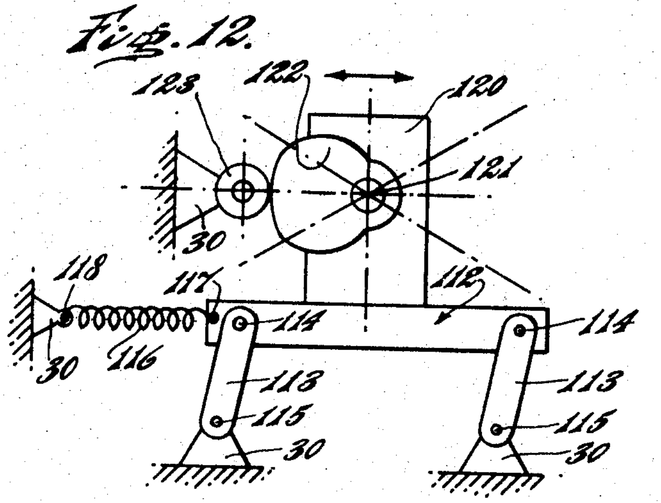

FIGURE 12 shows in horizontal section a simple method for using the welding wire-driving motor to actuate an oscillatory motion of the arc across the plate thickness to obtain distribution of heat in the weld.

Figure 13:
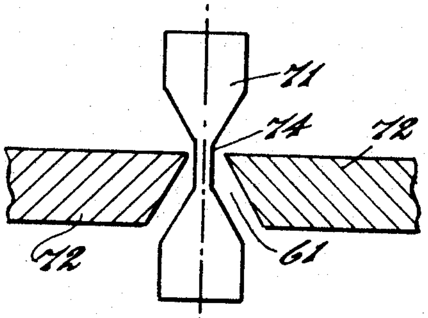

FIGURE 13 illustrates in diagrammatic horizontal section the floating connections which transmit water, gas and telephone wires from one side of the plates to the other through a narrow gap between them.

Figure 14:
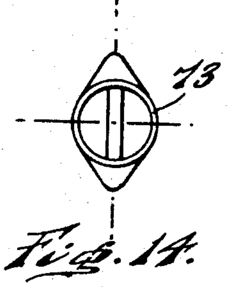

FIGURE 14 is an elevation of the floating connection looking toward the plate.

Figure 15:
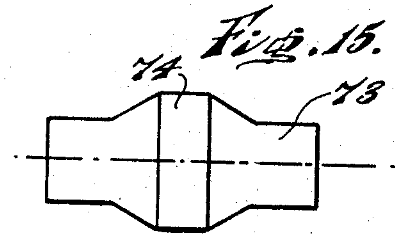

FIGURE 15 is a side view of the floating connection.

Figures 16, 17, 18:
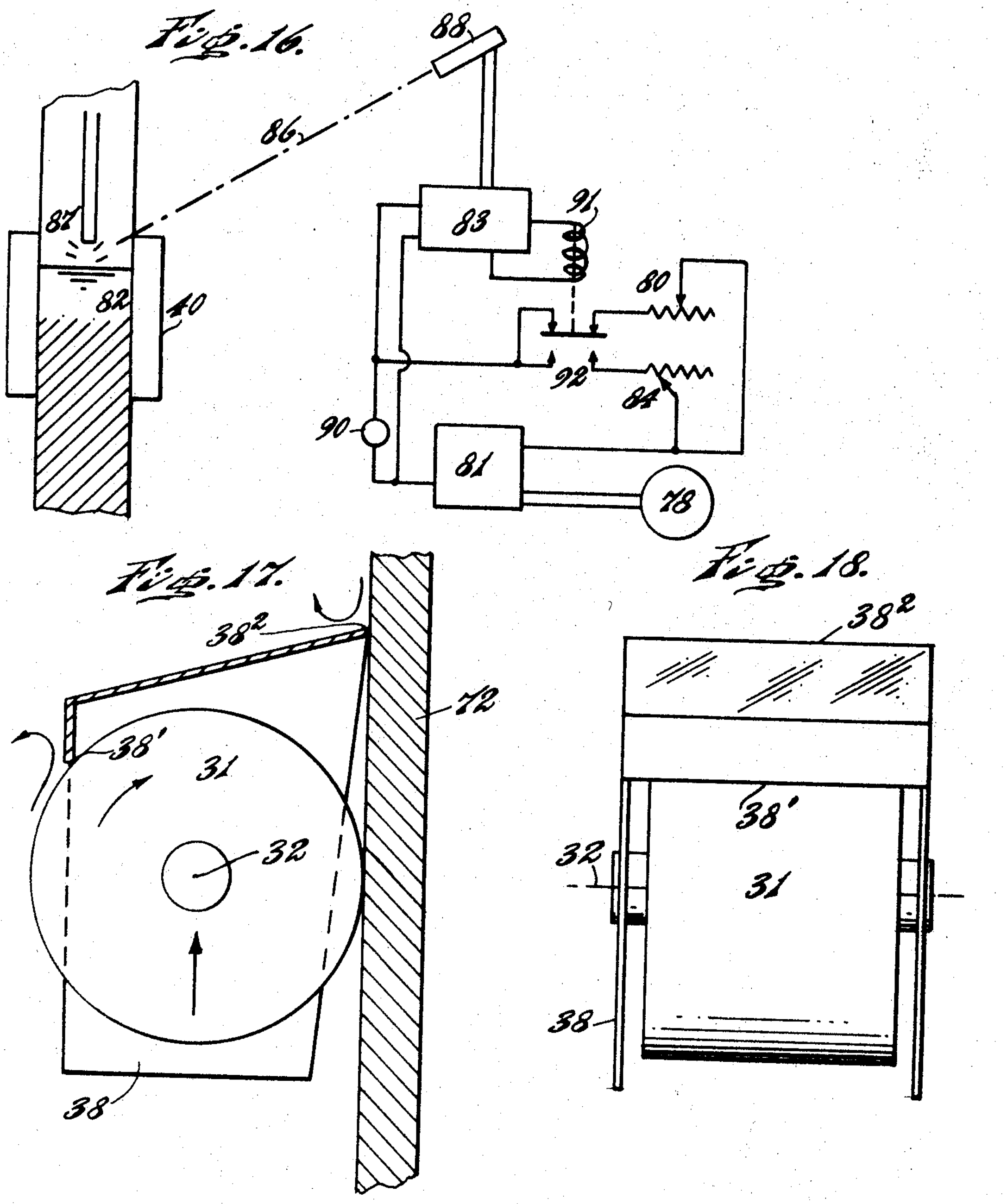

FIGURE 16 is an electric circuit diagram showing mechanism for advancing the carriage.

FIGURE 17 is a central vertical section through a magnet roll shown diagrammatically and its cover.

FIGURE 18 is a front elevation of FIGURE 17.

Describing in illustration but not in limitation and referring to the drawings:

FIGURE 1 shows a typical welding machine designed to weld vertical joints in hulls in ships by the electrogas or electroslag process.

Two types of joints will be considered in the present connection. One is the open gap joint which requires retaining means for liquid metal and slag on the back face of the plate as well as on the front face. Another is the closed joint in which only the front shoe is required to retain the molten weld pool, preferably with a back strip of metal or glass tape as a stationary retainer applied over the joint on the back face or with two welding passes, one applied to each side. In the first case, passage is required through the gap, no matter how narrow it may be (down to 5/32") for means for supporting the back shoe and for water, gas and telephone connections for respectively cooling the back shoe, protecting the hot metal by suitable gas injection and for communication between the operator in the front and his helper in the back. In the second case above mentioned, no such passage is required and the pressure of the front shoe is provided exclusively by the attraction of the magnet rolls upon the plate, while a similar pressure is given to the guiding roll tracking into the groove or chamfer of the joint being welded.

The machine of FIGURE 1, which is shown arranged for two-shoe operation with a 3/16 inch gap between the plates, comprises a tubular rigid frame 30 carrying four permanent magnet rolls 31 which are free-rotating around their axes. Each roll is pivoted on an axle 32 having suitable bearings in a gimbal frame 34 pivoted at the ends at 35 in gimbal carriers 36 which have gimbal pivots 37 mounted in the frame 30. This permits all rolls to make good contact even on a horizontally curved pair of plates such as in cylindrical storage tanks or mine shaft liners.

The magnet rolls 31 are protected by nonmagnetic covers 38, of bronze, copper or aluminum sheet for example, which act as scrapers against the rolls at 38' and against the plates at 38². See showing in FIGURES 17 and 18. They prevent foreign magnetic material, such as loose bolts, nuts, tools, etc., from wedging themselves between the rolls and the plate and causing interference in the raising motion. As shown in FIGURE 17, the covers are pivoted freely on the axes of the rolls, and pressure from the roll scrapers on the rotating roll tends to rotate the cover toward the plate, thereby providing pressure for the plate scraper upon the plate.

Between and below the magnet rolls 31 an external or front shoe 40, suitably of copper, is pressed against the joint to retain the molten pool, while above the magnets a biconical bronze guiding roll 41 is pivotally mounted on the frame 30, for tracking in the chamfer. By means of a nut 42 acting from the frame and threaded on a screw 43 supporting the shoe 40, passing through a hole in the frame and having on the other side a helical compression spring 44 surrounding the screw, pressure is applied on the shoe 40. The pressure of the guiding roll 41 from spring 44 also can be adjusted against the joint 61, such pressures being reversely proportional to the respective distances from the magnet rolls to the shoe and to the guiding roll. The maximum pressure on the front shoe and on the guiding roll equals the holding capacity of the four combined magnet rolls, but the pressure of the front shoe is supplemented by the pressure of the back shoe, when used, against the plates, as later explained.

This carriage is self-tracking when it is going up the vertical plates exactly as a semitrailer follows the path of its tractor on the road.

Any lateral deviation or wandering of the lower part of the carriage corrects itself by the rolling action of the magnet rolls which are always directed toward the center line guided by the guiding roll 41. Corrective steering of the magnet rolls is nevertheless provided by a screw 45 turning freely in a portion of the frame, held by the collar 46 and threaded into a connecting bar 47 which pivotally guides at 48 the lower portions of the respective gimbal frame pivots 37', which in turn are guided by slots 50 on the frame portions 51.

Figures 1A, 2:
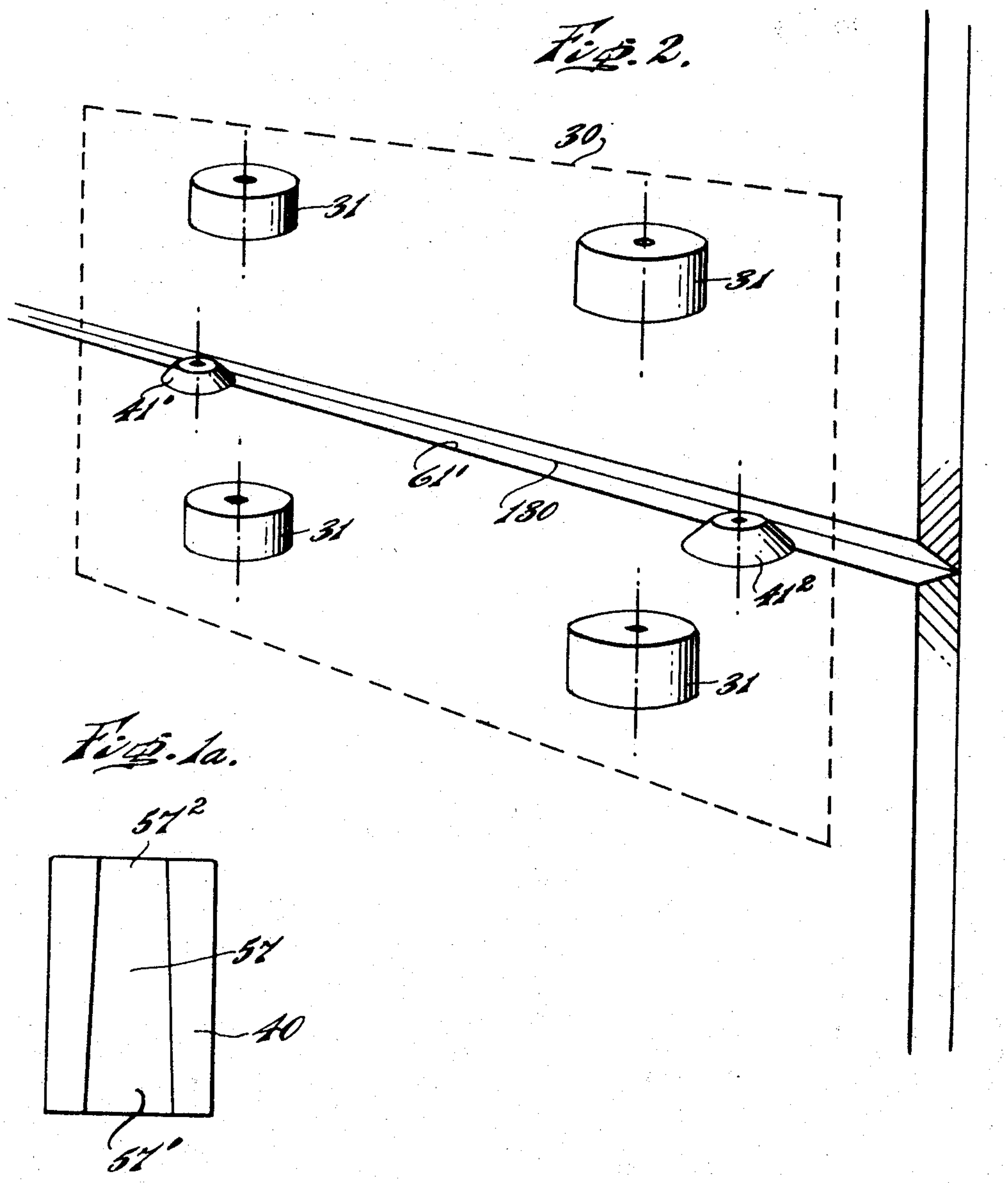
FIGURE 2 is a diagrammatic perspective view of a horizontally moving and self-supporting carriage of the invention, the view merely showing the magnet rolls and the guiding rolls, omitting the axles, bearings and frame, the welding head and the other tooling devices mounted thereon.

A screw 52 turns freely in a portion of the frame 30 and is held in position by a helical compression spring 53 surrounding the scew between the opposite side of the frame 30 and a link 54 through which the screw threads. Link 54 pivotally connects at 55 to a lug 56 for adjusting shoe 40 angularly around the axis of screw 43, allowing the faulty guiding by the weld reinforcement itself acting as a track for the shoe because of the recess 57 in the face thereof. For this reason, the recess or groove 57 in the face of the shoe is desirably slightly wider at the bottom at 57' than at the top at 57² as shown in FIGURE 1*a*, and the pressure upon the shoe is desirably applied on the upper half of its height.

On the opposite side of the weld groove there is a back shoe 58, suitably of copper, having a vertical groove 60 in its face opposite the weld groove 61. The back shoe 58 is held and adjusted in customary fashion by vertical link 62 pivoted at the end of a compression blade 63 attached to the frame 30 and thin enough to pass through the gap 61 between the plates. Another blade 64 also attached to the frame 30 at a lower level is used to exert a pull on the link 62 because of a nut 65 acting on a stationary screw 66 passing through the link 62, to produce pressure on the shoe 58 against the back face of the joint. This shoe is also adjusted in position and angle, for example by the combined action of two parallel screws 67 and 68 threaded into a center plate 70 secured to the back of the shoe 58 and extending between the sides of the link. The screws are permitted to freely turn but longitudinally restrained in the link 62 by internal collars not shown, so that the screws can move the shoe 58 laterally or tilt the shoe in either direction sideways.

A preferred way to convey water, gas and telephone wires from the front to the back face of the plates through the narrow gap 61 consists in using a plurality of seamless steel tubes flattened to about ⅛" thickness, as shown in FIGURES 13 to 15, where the flattened tube 71 passes through the groove 61 between plates 72. The tube has a round portion 73 remote from the groove and a flattened portion 74 which goes through the groove. To prevent wear around the edges of the gap, pressure is minimized on the tubes by mounting the various tubes as a free unit extending through the gap without rigid attachment to the carriage. The group of tubes is preferably also provided with one hard steel blade at the top and one at the bottom to accept the major part of the wear due to sliding between the plates during welding. Where desired, a motor-driven disc grinder or milling machine head is installed on the carriage suitably above the guiding roll 41, to assure free passage of the blades 63 and 64 in case the gap 61 is too narrow as a result of poor fit-up or after shrinkage caused by previous welding of lower portions of the plate. This mechanism is illustrated at 75 in FIGURE. 1.

A carriage raising mechanism can be of various forms. It can be located on the carriage itself, preferably above the guiding roll 41, or it can be installed on the top deck of the ship as a winch 76 pulling a chain or cable 77 as in FIGURE 10. A chain is preferred to a cable because it is more rigid lengthwise. The rise can be accurately adjusted in speed and preferably be automatically synchronized with the speed of weld deposition in the joint.

One method of synchronization which has proved excellent uses a potentiometer-controlled variable speed motor; one potentiometer, normally active, is set lower than the required speed. As the welding arc rises inside the shoe, it becomes visible for a photoelectric cell (electric eye) because the arc is no longer shadowed by the edge of the shoe or of a suitable stationary screen interposed between arc and eye. The cell then activates a relay which cuts off the first potentiometer, replacing it by a second one set higher than the desired speed. As the shoe now gains over the rise of the arc or weld, the latter becomes shadowed again by the shoe and the first potentiometer resumes its function.

In FIGURE 16, the arc 87 or the molten metal 82 (electroslag process) emits a ray of light 86 reaching the photoelectric cell 88. When illumination becomes sufficient, this photosensitive cell energizes the relay coil 91 of a contactor 92, through an amplifier 83 energized by power source 90. A motor speed control 81 receives now its signal from potentiometer 84 instead of potentiometer 80, and accelerates the hoist motor 78.

Thus a single motor accomplishes the control, without overheating due to starts and stops.

In FIGURE 1, a chain 77 is secured at the top of an 8 foot extension installed on the top deck of the ship to allow completion of the weld after the magnet rolls have run off the top plates (the extension is not shown). The chain 77 passes in front of an idler 97 which is attached to the top of a short mast or extension from the frame of the carriage and used to offset the outward pull due to the weight of the carriage. The chain 77 next passes under and around a chain wheel 98 and then over an idler wheel 100 before dropping out of the bottom of the carriage. The chain wheel 98 carries teeth or cavities gripping the chain firmly and is driven at an adjustable speed by variable speed motor 101, through suitable speed reducers 102 and 103 as well known. Optionally, a disengageable clutch 104 is provided in the drive for fast release of the chain in order to lower the carriage by a crane to begin welding at a different location around the hull.

In a prototype of the device, the minimum speed of rise was 0.25 inch per minute and the maximum speed of rise 6 inches per minute. A pawl 105 riding suitable ratchet notches on wheel 98 or the chain links themselves is manually disengaged when reversing the chain motion and otherwise engages progressively under the action of a pawl spring, not shown, as the wheel 98 advances. The chain wheel is surrounded by an arcuate chain cover 106 pivoted at 107 so that if the chain should miss the cavities in the chain wheel 98, it will push the chain cover 106 so as to operate switch 108 in circuit with the motor 101 and automatically stop the operation of the motor.

The carriage is provided with usual components for electrogas or electroslag welding, as shown in Rene D. Colinet U.S. Patent No. 3,193,660.

These consist of a motorized welding head or several motorized welding heads, and one or more reels for coiled electrode, plus control electrical cabinets and means for water-cooling the shoes 40 and 58, and for introducing a protecting gas on the top of the weld pool in many cases. The customary oscillation of the welding arc across the plate thickness can be provided very simply in the present installation by mounting the welding head 112, shown in FIGURE 12, on a suitable oscillating linkage, for example parallel links 113 pivoted to the welding head at 114 and pivoted to the frame 30 at 115. The welding head will suitably be spring biased at 116 by a helical tension spring secured to the head by a spring abutment 117 and secured to the frame by spring abutment 118. A suitable motor 120 which may be a welding head-drive motor or rise transmission drive, is provided, having a shaft 121 with a cam 122 which engages and rides against a follower roller 123 pivotally mounted on the frame 30. The cam follower maintains contact with the cam due to the action of spring 116 and thereby causing the electrode-feed motor 120 and its wire guide to oscillate back and forth in the direction of the thickness of the plates and the weld, with or without dwell periods at opposite ends, depending on the cam design.

In order to protect against drafts and wind action, the arc can be partially enclosed in a box-like frame with transparent partitions of spatter-proof plastic material, for example of the character used in lens covers for welders' helmets.

In a prototype of the mechanism of the present invention, the crawler carriage complete weighed 480 pounds. Each of the four magnet rolls sustained a pull of 150 pounds. The chain had a load-bearing capacity of 1175 pounds. If a hoisting chain had not been used, the carriage could only have weighed 60 pounds or $\frac{1}{10}$ of the total magnetic force of 600 pounds, but due to the hoisting mechanism, the carriage weight was safely increased to 480 pounds.

The operator can of course, gain access to the equipment from a ladder, scaffold, or bosun's chair. As a modification, by making allowance for the weight of the operator and associated equipment, a platform may be attached to the carriage and can rise with it. If an operator-carrying platform is to be used, it is strongly recommended that a second undriven chain be employed, as shown in FIGURE 11.

A safety chain 124 is secured at one end 125 to one side of the frame 30 of the carriage and then passes up over idler rollers 126 and 127 mounted, for example, on the upper deck of a ship and then downward through a chain roller and pawl combination 128, similar to the chain roller 98 and pawl 105 in FIGURE 1. By keeping the safety chain taut, as the carriage goes up there is an extra assurance against falling.

FIGURE 2 shows a carriage frame 30 having magnet rolls 31 mounted thereon, as in FIGURE 1, and designed to crawl horizontally along a weld groove 61' between plates to be welded. Conical tracking rolls 41' and $41^2$ are pivotally mounted on the frame and rise on the ledge 130 of the weld groove. If desired, the ledge 130 can be provided by welding on a rib.

Alternately, as shown in FIGURE 3, the rolls 41' and $41^2$ can be replaced by extending above the frame 30 flanged wheels 131 pivoted at the top of the frame and riding along the top of the upper plate, supported by outward extensions 132.

As an alternative, as shown in FIGURE 3*a*, wheels 131' can roll along horizontal rib 130', secured as by welding to the plates.

In both cases, if desired the magnet rolls 31 can be motor-driven for traction of the carriage horizontally along the joint, or other means of propulsion can be provided. Contrary to the practice on conventional machines used in the trade for welding three o'clock joints, any number of plates may be attached above the horizontal joint which is still unwelded, instead of only one as in present practice, because pressure of the shoe against the plate is obtained independently of the height of the support for the machine.

The severe restriction imposed on the work of the erecting crew is then lifted, since they do not have to wait for completion of welding of one horizontal row before they set a second or a third ring of plates above the one which is still awaiting welding.

FIGURE 4 shows a pair of pressure rollers 133 illustrated in FIGURE 1, pivoted on the upper end of the link 62, riding against the reverse side ofthe plates 72 to be welded. This permits operation on overhung plates 134 as found in profiled hulls of fast ships, especially at the bow and the stern. This is possible when welding with a gap of at least of the order of $\frac{5}{32}$ inch between the plates. Even though the chain 77 now pulls the machine away from the ship, pressure of the rolls 133 against the inner face of the hull retains the carriage in proper position with extra pressure added to the magnet rolls 31 against the front face of the hull.

It is possible with this design to weld without interruption from curved to vertical surfaces or from vertical to overhung surfaces.

In overhanging operation, the chain 77 should be laid on the plate side of the idler 97 shown in FIGURE 1, instead of on the operator's side, as it actually appears in FIGURE 1.

FIGURE 5 shows a carriage capable of moving in any direction on a vertical surface. Its magnet rolls 31 provide strong adherence to the plates 72 while the gravity pull is neutralized by a chain 77 passing over a pulley 135 pivotally mounted on a frame 136 which rides along the top of the plates on flanged rolls 137. The other end of the chain 77 is attached to a counterweight 138 on the inside of the plates, and having a weight approximately equal to that of the carriage. If desired, the magnet rolls 31 in this form can be motor driven and steerable.

FIGURE 6 illustrates a foldable magnetic crawler carriage having a frame 30' which is divided into two parts, 140 and 141, each having a set of magnet rolls 31 mounted thereon and capable of turning. The two parts 140 and 141 of the frame are vertically hinged at 142 to make the frame foldable, so that the carriage can track on two vertical planes, intersecting one another at any angle. The hinge 142 can be locked in any desired position, as well known. In this form the wire guide 143 is shown directed toward the gap 61 between the plates 72. As shown in FIGURE 6, the machine is similar to FIGURE 1 and can be used on butt welds, although it can be used on an external corner as shown in FIGURE 9, the wire guide 143' entering the weld groove 61. When the hinge is released and folded 90° and then again locked, the device can be used as shown in FIGURE 7 for inside corners or T-joint welding either with a fillet weld and the wire guide $143^2$ set at 45° to the frames, or with a full penetration weld and the wire guide $143^3$ set at 0° to one of the frames. In fact, the two halves of the frame can be set at any desired angle, as shown in FIGURE 8, again orienting the wire guide $143^4$ pivoting around the same vertical axis as the hinge or on any parallel axis.

The magnetic crawler of the invention can be generally defined as a carriage adhering to vertical or inclined steel surfaces which are plane or curved, by the attraction of magnetic rolls, either idle or motorized. The support against gravitational forces is provided by mechanical nonmagnetic hoisting means and the combination of both features increases the capability of load carrying and presents great advantages, especially in the welding industry.

In view of our invention and disclosure variations and modifications to meet individual whim or particular need will doubtless become evident to others skilled in the art, to obtain all or part of the benefits of our invention without copying the structure shown, and we therefore claim all such insofar as they fall within the reasonable spirit and scope of our claims.

Having thus described our invention, what we claim as new and desire to secure by Letters Patent is:

1. A crawler carriage for electric welding of magnetic work which involves a weld groove directed generally vertically, by means of an electrode feed motor advancing an electrode, and shoe means bridging the weld groove and retaining weld metal in the groove, in combination with a pliable elongated member contributing to the support of the carriage, motorized hoisting means acting on the pliable elongated member, a free-idling guiding roll rotatably mounted on the carriage and engaging in the weld groove above the shoe means for tracking purposes, and free-idling magnetic roll means rotatably mounted on the carriage, pressing against the work and preventing separation between the carriage and the work by magnetic attraction.

2. A crawler carriage of claim 1, including first and second frames, each of which has magnetic free-idling rolls engaging work which is set at an angle and hinge means connecting the frames pivoting on an axis parallel to the climbing motion of the carriage, and permitting angular adjustment of the frames.

3. A crawler carriage of claim 1, in combination with nonmagnetic scraper means on the magnetic roll means ahead and above the contact zone between the magnetic roll means and the work, to remove foreign matter which might otherwise get caught between the rolls and the work, thereby causing separation and loss of magnetic attraction.

4. A crawler carriage of claim 1, in combination with a wheel deflecting the pliable elongated member to increase pressure of the upper part of the carriage against the work when climbing upon an overhanging surface.

References Cited

UNITED STATES PATENTS

| | | | |
|---|---|---|---|
| 1,965,331 | 7/1934 | Chapman | 219—125 |
| 2,395,723 | 2/1946 | Chmielewski | 219—126 |
| 2,892,071 | 6/1959 | Kitrell | 219—125 |
| 3,035,156 | 5/1962 | Staley | 219—125 |
| 3,084,246 | 4/1963 | Rieppel et al. | 219—125 |
| 3,128,368 | 4/1964 | Franz et al. | 219—125 |
| 3,164,714 | 1/1965 | Swan et al. | 219—126 |
| 3,193,660 | 7/1965 | Colinet | 219—126 |
| 3,204,082 | 8/1965 | Dudko et al. | 219—126 |
| 3,235,705 | 2/1966 | Agnew et al. | 219—126 |
| 3,247,357 | 4/1966 | Koch | 219—126 |
| 3,249,733 | 5/1966 | Santilhano. | |
| 3,303,321 | 2/1967 | Harmsen et al. | 219—126 |

RICHARD M. WOOD, *Primary Examiner.*

W. D. BROOKS, *Assistant Examiner.*